United States Patent
Viola et al.

[11] Patent Number: 5,861,353
[45] Date of Patent: Jan. 19, 1999

[54] CATALYST IN GRANULAR FORM FOR 1,2-DICHLOROETHANE SYNTHESIS

[75] Inventors: Augusto Viola, Armeno; Massimo Brusa; Bernardo Merighi, both of Novara; Giuseppe Gubitosa; Luigi Cavalli, both of Novara; Michele Rossi, Peschiera Borromeo, all of Italy

[73] Assignee: Montecatini Tecnologie S.r.l., Milan, Italy

[21] Appl. No.: 674,459

[22] Filed: Jul. 2, 1996

Related U.S. Application Data

[63] Continuation of Ser. No. 276,345, Jul. 18, 1994, abandoned, which is a continuation-in-part of Ser. No. 984,315, Dec. 1, 1992, Pat. No. 5,330,958.

[30] Foreign Application Priority Data

Oct. 6, 1992 [IT] Italy .................................. MI92A2301
Apr. 5, 1994 [IT] Italy .................................. MI94A0640

[51] Int. Cl.$^6$ .................................................. B01J 27/122
[52] U.S. Cl. ............................ 502/225; 502/439; 502/527
[58] Field of Search .................................. 502/225, 439, 502/527

[56] References Cited

U.S. PATENT DOCUMENTS

| | | | |
|---|---|---|---|
| 3,461,084 | 8/1969 | Li et al. .................................. | 502/225 |
| 3,639,270 | 2/1972 | Koyanagi et al. ........................ | 502/225 |
| 3,966,644 | 6/1976 | Gustafson . | |
| 4,054,609 | 10/1977 | Osugi et al. .............................. | 502/255 |
| 4,366,093 | 12/1982 | Shiozaki et al. ......................... | 502/439 |
| 4,441,900 | 4/1984 | Huang . | |
| 5,098,878 | 3/1992 | Hirschmann et al. ................... | 502/225 |
| 5,166,120 | 11/1992 | Deller et al. ............................. | 502/225 |
| 5,330,958 | 7/1994 | Viola et al. .............................. | 502/316 |
| 5,371,277 | 12/1994 | Matsumoto et al. ..................... | 502/439 |

FOREIGN PATENT DOCUMENTS

| | | |
|---|---|---|
| 0 095 951 | 7/1983 | European Pat. Off. . |
| 0 102 641 | 3/1984 | European Pat. Off. . |
| 0 357 506 | 8/1989 | European Pat. Off. . |
| 0 355 664 A1 | 2/1990 | European Pat. Off. . |
| 0 375 202 A1 | 6/1990 | European Pat. Off. . |
| 0 461 431 A1 | 12/1991 | European Pat. Off. . |
| 0 464 633 A1 | 8/1992 | European Pat. Off. . |
| 0 591 572 A1 | 4/1994 | European Pat. Off. . |
| 31 13 179 A1 | 1/1982 | Germany . |

Primary Examiner—Walter D. Griffin
Attorney, Agent, or Firm—Bryan Cave LLP

[57] ABSTRACT

An ethylene oxychlorination catalyst in granular form, consisting of $CuCl_2$ supported on an alumina carrier, displaying a cylindrical configuration with trilobed cross-section provided with three through-bores equidistant from each other, each of which through-bores has its axis parallel to the axis of the cylindrical granule.

18 Claims, 1 Drawing Sheet

5,861,353

CATALYST IN GRANULAR FORM FOR 1,2-DICHLOROETHANE SYNTHESIS

CROSS-REFERENCE TO RELATED APPLICATION

This is a continuation of U.S. application Ser. No. 08/276,345, filed Jul. 18, 1994, now abandoned, which is a continuation-in-part of U.S. application Ser. No. 07/984,315, filed on Dec. 1, 1992, now U.S. Pat. No. 5,330,958.

BACKGROUND OF THE INVENTION

1. Field of the Invention

The present invention relates to a supported catalyst in the form of cylindrical granules, for 1,2-dichloroethane synthesis by fixed-bed ethylene oxychlorination. More particularly, the present invention relates to a catalyst comprising $CuCl_2$ as its active compound, supported on an alumina carrier. The cylindrical granules of the catalyst display a cross-section with at least three points of contact with a circumscribed circumference.

2. Description of the Prior Art

It is known that the synthesis of 1,2-dichloroethane by oxidative chlorination of ethylene can be carried out in a fluidized-bed or fixed-bed reactor. In the first case, a more uniform temperature distribution is obtained inside the reactor (with the arising of localized overheating phenomena—"hot spots"—being prevented); unfortunately, at the expense of a certain difficulty of fluidization due to a tendency of the catalytic particles towards sticking. In the second case, controling the reaction parameters is simpler but due to the reduced heat exchange coefficient between the catalyst granules, and between the latter and the reaction gas, hot spots may appear. The formation of such hot spots should be prevented for reasons of selectivity and to prolong the useful life of the catalyst.

A first attempt to solve the problem of the heat exchange between the granules of catalyst for ethylene oxychlorination had been made by resorting to ring-shaped granules or circular-cylindrical granules having a determined height-diameter ("aspect") ratio. Such type catalyst types are disclosed, in EP-B-54674 and U.S. Pat. No. 4,753,914, for example.

The problem of the heat exchange coefficient is not the only technical problem to be solved in the case of an efficient synthesis of 1,2-dichloethane in a fixed-bed reactor. In fact, a granular catalyst used in fixed-bed ethylene oxychlorination is also required to display the following characteristics:

low resistance to gas flow (low pressure drop with the height of the catalytic bed being the same);

large actual specific surface area, i.e., high surface:volume ratio; and good mechanical strength in order to prevent the catalytic particles from undergoing breakage as a consequence of bed packing.

The catalysts normally used in a fixed-bed oxychlorination process (which have a spherical, solid-cylindrical, or ring shape, with different dimensions) do not solve the problems discussed above to a satisfactory extent. Furthermore, when catalysts are used which have those shapes that are known from the prior art, the diffusion of the reactant gases inside the interior of the catalyst granules and the back-diffusion of the reaction products from the interior of said granules have often led to very limited results. This means that, when one takes into consideration that the oxychlorination reaction takes place in the heterogeneous system more easily and selectively on the outer surface of the catalyst granule, the oxychlorination catalysts having the shapes known from the prior art are not efficiently used. Therefore, in order to obtain the desired conversion rate, a large amount of catalyst must be used. In the case of a tube-bundle fixed bed, the need for a large amount of catalyst requires the use of tubes having heights suitable to accomodate the large amount of catalyst. With the known forms of oxychlorination catalysts, this causes a further increase in pressure drop, because the empty spaces between the catalyst granules are also limited.

Furthermore, in exothermic reactions, which generate large amounts of heat—such as oxidative, halogenation reactions—a high value of coefficient of heat exchange between the catalyst and the gas feed is required, in order to secure an adequate removal of reaction heat. Adequate removal of reaction heat is necessary to avoid consequent excessive overheating of the catalytic bed, which often damages the catalyst in the bed and/or reduces the catalytic performance thereof. In the case of the catalysts having the traditional shape, in order to accomplish a high heat exchange coefficient, the turbulence of the reaction gas on catalyst particles had to be increased, but such a contrivance would cause a further increase in pressure drops, with consequent increases in operation costs.

Catalysts with shapes different from those traditionally used are disclosed in U.S. Pat. No. 4,441,990; which relates to tubular extruded granules having an essentially triangular or quadrangular, multi-lobed cross-section. With such catalysts, some advantages are achieved in terms of breakage strength and pressure drop. However, the results are not very much different from the results which are obtainable with the traditionally shaped catalysts. Other non-traditional shapes of catalyst granules are disclosed in EP-A-464,633, with specific reference to the process for producing unsaturated esters.

There is a need for a catalyst granule having a configuration, which makes it possible for oxidative halogenation reaction results to be considerably improved.

SUMMARY OF THE INVENTION

The purpose of the present invention is to supply a novel oxychlorination catalyst which, besides considerably improving the obtainable results in terms of pressure drop, has a high surface area:volume ratio and has a high heat exchange coefficient as compared to the catalysts known from the prior art. Such catalyst characteristics make it possible for the activity and selectivity of the catalyst to be increased in the production of dichloroethane by oxidative chlorination of ethylene.

Such a purpose is achieved as a result of the cylindrical catalyst granules having at least three through-bores with axes substantially parallel to each other and to the axis of the granule, and which axes are substantially equidistant from each other.

The catalyst granules are preferably obtained by moulding alumina powder and subsequently impregnating the moulded bodies with aqueous solutions of $CuCl_2$ and KCl. Other alkali or alkaline-earth metal chlorides, e.g., $MgCl_2$, can also be used in the catalyst preparation.

Said through-bores preferably have a cross section of circular shape and, on the cross section of the particle, their axes define vertices of a substantially equilateral triangle, said vertices being oriented towards the points of contact of the cross section of the catalyst particle with the circumscribed circumference. According to the preferred embodiment of the invention, the granules display circular-cylindrical lobes equal to each other and coaxial with the through-bores.

Due to the above said characteristics, owing to the particular geometry of the granules, a high turbulence of the reaction gases on the same granules can be promoted under the same operating conditions as customarily adopted in the fixed-bed ethylene oxychlorination reactors. As they display a large free surface area in their cross section, said granules oppose a lower resistance to gas flow, and consequently result in lower pressure drops. Furthermore, the catalysts having a short equivalent diameter [equivalent diameter=6× (volume/total area surface)], results in a larger actual specific surface area, i.e., a high value of surface-area volume ratio. This high ratio makes it possible to obtain better contact of the reaction gases with the catalyst surface. Such increased contact favours the conversion of the reactants and limits the inner diffusion phenomena, with a consequent increase in oxychlorination reaction selectivity. In fact, with the catalyst according to the present invention, high yields of 1,2-dichloroethane are obtained by using a lower catalyst amount per unit volume, with respect to the catalysts having shapes known from the prior art.

According to a second embodiment of the present invention, the catalytic granule displays a cross-section having a substantially triangular shape with rounded vertices.

In both of the above embodiments, the ratio of the bore pitch (wherein, by "bore pitch", the distance between the respective axes is meant), to the diameter of the same bores, is preferably comprised within the range of from 1.15 to 1.5, and more preferably of from 1.3 to 1.4

The ratio of the height of the particle to the bore pitch is preferably comprised within the range of from 1.5 to 2.5, more preferably of from 1.7 to 2.3.

According to the first embodiment, the ratio of the bending radius of each lobe to the bore pitch is preferably comprised within the range of from 0.6 to 0.9 and, more preferably, of from 0.7 to 0.8. The ratio of the bending radius of the lobes to the radius of the through-bores is preferably comprised within the range of from 1.3 to 2.7, more preferably of from 1.8 to 2.10. The ratio of the radius of the circumscribed circumference to the cross-section, to the bending radius of the circular lobes is preferably comprised within the range of from 1.6 to 2, more preferably of from 1.7 to 1.85. The ratio of the surface area to the volume of each granule in the multilobed modifications results to be preferably higher than 2.0, more preferably higher than 2.2.

According to the second embodiment of the present invention, the ratio of the bending radius of each rounded vertex to the bore pitch is preferably comprised within the range of from 0.6 to 0.9, and, more preferably, of from 0.7 to 0.8. The ratio of the radius of the circumscribed circumference to the cross section, to the bending radius of each rounded vertex is preferably comprised within the range of from 1.6 to 2, and more preferably, of form 1.7 to 1.85. The ratio of the surface area to the volume of each granule in the multilobed modification results to be preferably higher than 2.0 and, still more preferably, higher than 2.2.

A further object of the present invention is a process for fixed-bed oxidative chlorination of ethylene into 1,2-dichoroethane which uses a catalyst having the novel shape as defined above. The fixed-bed modification of ethylene oxychlorination process normally implies using a plurality of reactors in cascade consisting of suitably thermostated bundles of catalyst-containing tubes. The reactor feed is generally constituted by a gas mixture of ethylene, hydrogen chloride and air. According to a modification of the fixed-bed oxychlorination process, air is replaced by oxygen.

In the fixed-bed oxychlorination process, the shape and size of catalyst granule are of basic importance to the results. By means of a granule having the geometry according to the present invention, surprising advantages are attained in terms of activity, selectivity, heat exchange and pressure drop through the catalytic bed.

Figure 1:
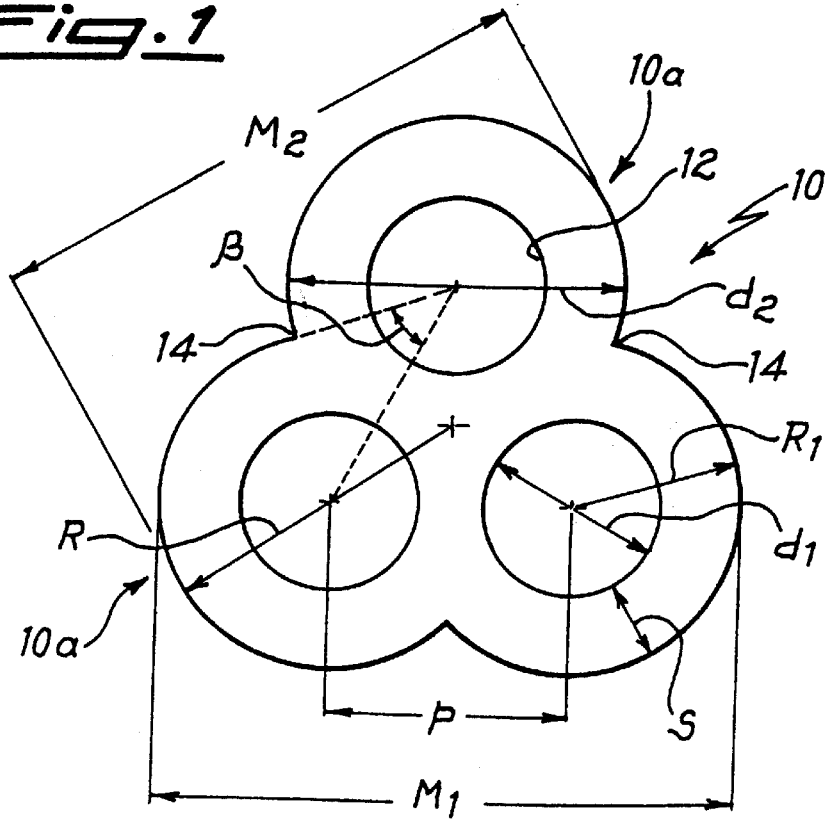
FIG. 1 is a planar cross-sectional view of a first embodiment of a catalytic granule for ethylene oxychlorination according to the present invention.

Referring to the drawings, with 10 a cylindrical granule (pellet) of catalyst for oxychlorination is displayed, which is provided with three circular through-bores 12 arranged with their respective centres at the vertices of an equilateral triangle.

DESCRIPTION OF THE PREFERRED
EMBODIMENTS

The particular geometry of the oxychlorination catalyst according to the present invention is disclosed now in detail, The accompanying drawings are referred to merely for the non-limitative purpose of exemplifying the invention.

According to the embodiment illustrated in FIG. 1, the pellet displays a trilobed cross-section, with circular lobes 10a joining each other at longitudinal grooves 14 arranged along the side surface of the pellet. The bores 12, the diameter of which is indicated in the drawings with the reference character $d_1$, are coaxial with the circular lobes 10a and together with them define walls of thickness "s". With "p", the pitch between the bores 12 (i.e., the distance between their centres) is indicated, and with $d_2$, the diameter of lobes 10a is indicated (the radius of said lobes is indicated with $R_1$). The radius of circumscribed circumference to the cross section of the cylindrical pellet is indicated with the reference R. With $M_1$ and $M_2$, the maximal and minimal dimensions of the cross section of the pellet are indicated.

Figure 2:
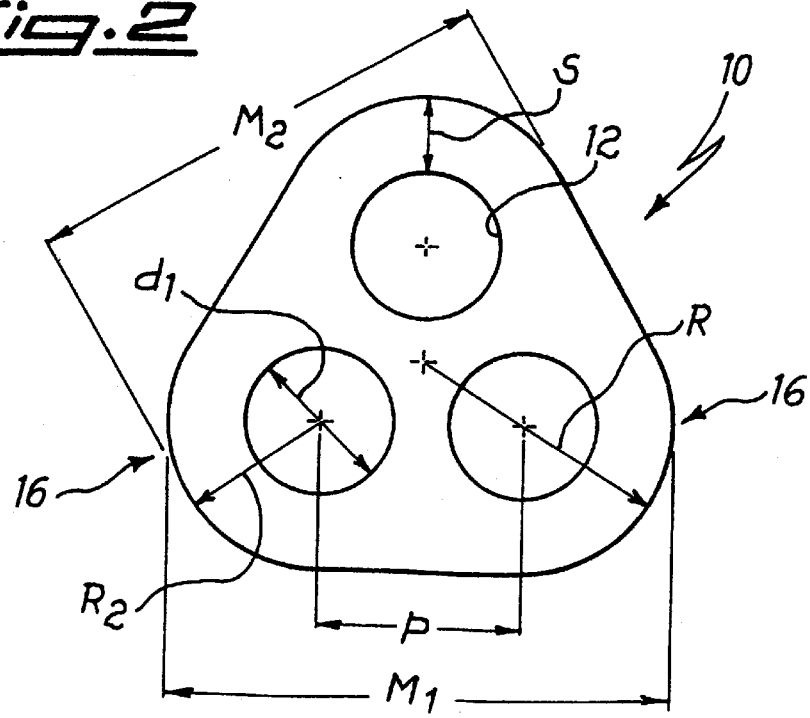
FIG. 2 is a planar cross-sectional view of a second embodiment of the catalytic granule according to the present invention.

Referring to the embodiment illustrated in FIG. 2, and in which, for analogous parameters, the same reference numerals and characters are used as in FIG. 1, the catalyst pellet displays a triangular cross section with rounded vertices 16. The latter have a bending radius as indicated with $R_2$.

In Tables 1, 2 and 3 enclosed with the instant disclosure, the size parameters are respectively reported of oxychlorination catalyst pellets according to FIGS. 1 and 2, and of a type of traditional catalyst of ring-like shape ("A" pellets), manufactured by using the fabrication technology as disclosed in the following examples. The physical-chemical characterizations of the catalysts are reported in Table 4.

From the data relevant to the dimensions and shape of the catalytic pellets, the volume of the solid body corresponding to the shape of one single pellet ("volume of corresponding solid body") of each pellet; and, from it, by measuring the bulk density of the catalyst (which depends on the fabrication pressure, on the characteristics of the alumina used as the starting material and on the firing modalities), the expected weight for each pellet can be calculated. The expected weight so calculated is in accordance with the experimentally found weight throughout the tested range of equivalent diameter values (3.40–2.20 mm).

The activity, selectivity rate and pressure drop values through the catalytic bed were determined in a flow-through reactor and are reported in Table 5.

EXAMPLES 1–4

A bohemite alumina powder having a surface area of 270 m$^2$/g and a pore volume of 0.5 cm$^3$/g was pelletized in order to yield shaped bodies as indicated in Table 1, and precisely cylindrical bodies of conventional type of 5×5×2 mm (Example A) and having the novel geometries according to the present invention (Examples B, C and D), by using suitable forming moulds.

After firing at 550° C. for 3 hours, the pellets were impregnated with a solution containing copper dichloride and potassium chloride in such amounts as to yield the following composition, by weight: CuCl$_2$=15%; KCl=5%; Al$_2$O$_3$=80%. After impregnation, the pellets were submitted to drying at 150° C. for 3 hours.

In order to determine the activity, the yield and the pressure drop of the catalysts, a tubular reactor of nickel was used which had an internal diameter of 26.6 mm and a height of 1300 mm, vertically installed inside a silicone oil based thermostating bath. The catalyst was charged to the fixed-bed reactor by using the following charging profile, from up downwards:

a 1st layer of 400 mm of thickness, constituted by catalyst mixed with graphite, having the form of extruded cylindrical bodies of 5×5 mm, in the ratio of catalyst:diluent=1:1 by volume;

a 2nd layer of 400 mm of thickness, constituted by neat catalyst.

Through the reactor a gas stream was fed from up downwards, with the following volume rate:

ethylene=21.6 Nl/h;

HCl=40 Nl/h;

air=57 Nl/h.

The external thermostating bath was kept at a temperature which secured an HCl conversion of 99%. The pressure downstream from the reactor was of 1 atm, and the reactor-head pressure compensated for the pressure drop through the reactor ($\Delta P$).

The reactor exiting reaction products were quenched. The liquid fraction was analyzed by gaschromatography by using a Hewlett-Packard gaschromatograph with capillary column suitable for separating 1,2 dichloroethane, chloral, ethyl chloride and other chlorinated byproducts, and the gas fraction was analyzed by means of a Carlo model Fractovap gas chromatograph equipped with suitable columns for separating ethylene, CO, CO$_2$, O$_2$ and N$_2$.

By comparing the results to traditional (ring-like) shaped catalysts, it can be clearly inferred that lower pressure drops are obtained with the catalyst shape according to the present invention, by using the same catalyst volume. If one takes into consideration that this novel catalyst displays a lower bulk density (expressed as g/cm$^3$), the advantage results to be still greater. In particular, the catalysts display a high HCl conversion at same, or lower, temperatures, as well as a higher selectivity (Examples B, C and D).

TABLE 1

Shape according to FIG. 1

| Catalyst Code | B | C | D | E | F | G |
|---|---|---|---|---|---|---|
| Height h (mm) | 5.0 | 6.0 | 6.0 | 5.0 | 4.0 | 5.0 |
| Bore diameter d$_1$ (mm) | 1.7 | 2.0 | 2.0 | 1.7 | 1.7 | 1.7 |
| Minimal thickness s (mm) | 0.8 | 0.9 | 1.0 | 0.90 | 0.65 | 0.85 |
| Hole pitch p (mm) | 2.35 | 2.70 | 2.70 | 2.20 | 2.20 | 2.20 |
| Max. overall dimension of cross section M1 (mm) | 5.65 | 6.50 | 6.70 | 5.70 | 5.20 | 5.70 |
| Min. overall dimension of cross section M2 (mm) | 5.34 | 6.14 | 6.34 | 5.41 | 4.01 | 5.41 |
| Surface area of cross section of corresponding solid body (mm$^2$) | 14.69 | 19.05 | 21.17 | 15.64 | 11.28 | 15.64 |
| Side surface area (mm$^2$) | 171.2 | 238.8 | 241.8 | 170.8 | 164.3 | 136.6 |
| Total surface area (mm$^2$) | 200.56 | 276.9 | 284.5 | 202.1 | 186.8 | 167.9 |
| Volume of corresponding solid body (mm$^3$) | 73.46 | 114.3 | 127.0 | 78.2 | 56.4 | 62.6 |
| Equivalent diameter (mm) | 2.20 | 2.48 | 2.24 | 2.32 | 1.81 | 2.24 |
| Ratio of surface area/volume S/V (mm$^{-1}$) | 2.73 | 2.42 | 2.68 | 2.58 | 3.31 | 2.68 |
| Ratio of hole diameter/hole pitch p/d1 | 1.38 | 1.35 | 1.3 | 1.29 | 1.29 | 1.29 |
| Diameter of lobes d2 (mm) | 3.30 | 3.80 | 4.00 | 3.50 | 3.00 | 3.50 |
| d2/d1 | 1.94 | 1.90 | 2.00 | 2.06 | 1.76 | 2.06 |
| R1/p | 0.70 | 0.70 | 0.74 | 0.80 | 0.68 | 0.80 |
| Ratio of height/pitch h/p | 2.13 | 2.22 | 2.22 | 2.27 | 2.27 | 1.82 |
| Radius of circumscribed circumference R(mm) | 3.01 | 3.46 | 3.56 | 3.02 | 2.77 | 3.02 |
| R/R1 | 1.82 | 1.82 | 1.78 | 1.73 | 1.85 | 1.73 |

TABLE 2

Shape according to FIG. 2

| Catalyst Code | H | I | L | M | N | O |
|---|---|---|---|---|---|---|
| Height h (mm) | 5.0 | 5.0 | 5.0 | 4.0 | 6.0 | 6.0 |
| Bore diameter; d1 (mm) | 1.7 | 1.7 | 1.7 | 1.7 | 2.0 | 2.0 |
| Minimal thickness s (mm) | 0.90 | 0.80 | 0.65 | 0.90 | 0.90 | 1.00 |
| Hole pitch p (mm) | 2.20 | 2.35 | 2.20 | 2.20 | 2.70 | 2.70 |

TABLE 2-continued

Shape according to FIG. 2

| Catalyst Code | H | I | L | M | N | O |
|---|---|---|---|---|---|---|
| Max. overall dimension of cross section M1 (mm) | 5.70 | 5.65 | 5.20 | 5.70 | 6.50 | 6.70 |
| Min. overall dimension of cross section M2 (mm) | 5.41 | 5.34 | 4.91 | 5.41 | 6.14 | 6.34 |
| Surface area of cross section of corresponding solid body (mm$^2$) | 16.46 | 15.77 | 12.25 | 16.46 | 20.46 | 22.50 |
| Side surface area (mm$^2$) | 168.1 | 167.2 | 160.2 | 134.5 | 233.3 | 237.1 |
| Total surface area (mm$^2$) | 201.0 | 198.7 | 184.7 | 167.4 | 274.2 | 282.1 |
| Volume of corresponding solid body (mm$^3$) | 82.4 | 78.8 | 61.3 | 65.8 | 122.8 | 134.1 |
| Equivalent diameter (mm) | 2.46 | 2.38 | 1.99 | 2.36 | 2.69 | 2.87 |
| Ratio of surface area/volume S/V (mm$^{-1}$) | 2.44 | 2.52 | 3.02 | 2.54 | 2.23 | 2.09 |
| Ratio of hole diameter/hole pitch p/d1 | 1.29 | 1.38 | 1.29 | 1.29 | 1.35 | 1.35 |
| Diameter of lobes d2 (mm) | 3.50 | 3.30 | 3.00 | 3.50 | 3.80 | 4.00 |
| d2/d1 | 2.06 | 1.94 | 1.76 | 2.06 | 1.90 | 2.00 |
| R1/p | 0.80 | 0.70 | 0.68 | 0.80 | 0.70 | 0.74 |
| Ratio of height/pitch h/p | 2.27 | 2.13 | 2.27 | 1.82 | 2.22 | 2.22 |
| Radius of circumscribed circumference R(mm) | 3.02 | 3.01 | 2.77 | 3.02 | 3.46 | 3.56 |
| R/R1 | 1.73 | 1.82 | 1.85 | 1.73 | 1.82 | 1.78 |

TABLE 3

Cylindrical shape

| Catalyst code | A |
|---|---|
| Height (mm) | 5.0 |
| Outer diameter (mm) | 5.0 |
| Inner diameter (mm) | 2.0 |
| Thickness (mm) | 1.5 |
| Surface area of cross section of corresponding solid body (mm$^2$) | 16.5 |
| Side surface area (mm$^2$) | 110.0 |
| Total surface area (mm$^2$) | 143 |
| Volume of corresponding solid body (mm$^3$) | 82.5 |
| Equivalent diameter (mm) | 3.5 |
| Free surface area of cross section (mm$^2$) | 3.1 |

TABLE 4

Oxychlorination Catalyst
Physical-chemical Characterization

| Catalyst code | Pellet Height, mm | Chemical Analysis | | | BET | | | | Average pore radius, Å | Axial breaking strength kg/p |
|---|---|---|---|---|---|---|---|---|---|---|
| | | CuCl$_2$, % by weight | KCl, % by weight | Al$_2$O$_3$, % by weight | Specific Area, m$^2$/g | True density, g/cm$^3$ | Bulk density, g/cm$^3$ | Pore volume, cm$^3$/g | | |
| A | 5.00 | 15.00 | 5.00 | 80.00 | 110 | 3.15 | 1.62 | 0.30 | 55 | 68 |
| B | 5.00 | 15.00 | 5.00 | 80.00 | 107 | 3.01 | 1.56 | 0.31 | 58 | 70 |
| C | 6.00 | 15.00 | 5.00 | 80.00 | 112 | 3.00 | 1.53 | 0.32 | 57 | 73 |
| D | 6.00 | 15.00 | 5.00 | 80.00 | 115 | 3.00 | 1.53 | 0.32 | 59 | 80 |

TABLE 5

Inner diameter of the reactor = 26.6 mm

Height of the catalytic bed = 800 mm

Flow rates:

Ethylene = 21.6 Nl/h

HCl = 40 Nl/h

Air = 57 Nl/h

Catalyst composition:

CuCl$_2$ = 15% by weight

KCl = 5% by weight

Al$_2$O$_3$ = 80% by weight

TABLE 5

| Example | Temperature of thermostatic bath, °C. | HCl conversion, mol % | Selectivity to DCE, mol % | Ethyl chloride, mol % | Chloral, mol % | $Co_x$, mol % | Pressure drop, mm $H_2O$ |
|---|---|---|---|---|---|---|---|
| A | 200 | 99.0 | 97.7 | 0.35 | 0.25 | 1.00 | 5.3 |
| B | 195 | 99.0 | 98.5 | 0.15 | 0.15 | 0.7 | 5.1 |
| C | 198 | 99.0 | 98.2 | 0.20 | 0.15 | 0.8 | 4.4 |
| D | 200 | 99.0 | 98.0 | 0.25 | 0.20 | 0.9 | 4.0 |

We claim:

1. A supported catalyst having the form of cylindrical granules for 1,2-dichloroethane synthesis by fixed-bed oxychlorination of ethylene, the catalyst comprising copper chloride as its active component, the copper chloride being supported on the granules, and the granules comprising alumina, characterized in that each granule displays at least three through-bores having axes which are substantially parallel to each other and to the axes of the granule, and substantially equidistant from each other.

2. Catalyst according to claim 1, characterized in that said granules are obtained by shaping alumina powder in a mold and subsequently impregnating the resulting shaped bodies with copper chloride and potassium chloride.

3. Catalyst according to claim 1, characterized in that said through-bores have a circular cross section and have axes which, on the cross section of the particle, define vertices of a substantially equilateral triangle, with said vertices being orientated towards the point of contact of the cross section with the circumscribed circumference.

4. Catalyst according to claim 3, characterized in that said granules display circular-cylindrical lobes, equal to each other and coaxial with said through-bores.

5. Catalyst according to claim 3, characterized in that the ratio of the bore pitch (p) to the diameter of the bores ($d_1$) is comprised within the range of from 1.15 to 1.5.

6. Catalyst according to claim 3, characterized in that the ratio of the height of the particle to the pitch of the bores is comprised within the range of from 1.5 to 2.5.

7. Catalyst according to claim 3, characterized in that the ratio of the bending radius of each lobe to the pitch of the bores is comprised within the range of from 0.6 to 0.9.

8. Catalyst according to claim 7, characterized in that the ratio of the bending radius of the lobes to the radius of the through-bores is comprised within the range of from 1.3 to 2.7.

9. Catalyst according to claim 3, characterized in that the ratio of the radius of the circumscribed circumference to the cross section, to the bending radius of each rounded vertex is comprised within the range of from 1.6 to 2.

10. Catalyst according to claim 3, characterized in that the ratio of the surface area to the volume of each granule is higher than 2.

11. Catalyst according to claim 2, characterized in that said through-bores have a circular cross section and have axes which, on the cross section of the particle, define vertices of a substantially equilateral triangle, with said vertices being orientated towards the point of contact of the cross section with the circumscribed circumference.

12. Catalyst according to claim 11, characterized in that said granules display circular-cylindrical lobes, equal to each other and coaxial with said through-bores.

13. Catalyst according to claim 11, characterized in that the ratio of the bore pitch (p) to the diameter of the bores ($d_1$) is comprised within the range of from 1.15 to 1.5.

14. Catalyst according to claim 11, characterized in that the ratio of the height of the particle to the pitch of the bores is comprised within the range of from 1.5 to 2.5.

15. Catalyst according to claim 11, characterized in that the ratio of the bending radius of each lobe to the pitch of the bores is comprised within the range of from 0.6 to 0.9.

16. Catalyst according to claim 15, characterized in that the ratio of the bending radius of the lobes to the radius of the through-bores is comprised within the range of from 1.3 to 2.7.

17. Catalyst according to claim 11, characterized in that the ratio of the radius of the circumscribed circumference to the cross section, to the bending radius of each rounded vertex is preferably comprised within the range of from 1.6 to 2.

18. Catalyst according to claim 11, characterized in that the ratio of the surface area to the volume of each granule is higher than 2.

* * * * *